United States Patent
Osakabe et al.

(10) Patent No.: US 7,877,979 B2
(45) Date of Patent: Feb. 1, 2011

(54) INTEGRATED GASIFICATION COMBINED CYCLE PLANT, METHOD OF CONTROLLING THE PLANT, AND METHOD OF PRODUCING FUEL GAS

(75) Inventors: Michihiro Osakabe, Yokohama (JP); Yasuo Kozaki, Yokohama (JP); Hideaki Tanaka, Yokohama (JP); Shunsuke Mishima, Yokohama (JP); Tatsuo Furusako, Yokohama (JP); Kazuyuki Shoumura, Yokosuka (JP); Takumi Saisu, Yokohama (JP); Hiroyuki Miyata, Tokyo (JP); Kotaro Watanabe, Tokyo (JP)

(73) Assignee: JGC Corporation, Tokyo (JP)

( * ) Notice: Subject to any disclaimer, the term of this patent is extended or adjusted under 35 U.S.C. 154(b) by 941 days.

(21) Appl. No.: 11/576,636

(22) PCT Filed: Oct. 4, 2005

(86) PCT No.: PCT/JP2005/018371

§ 371 (c)(1),
(2), (4) Date: Apr. 4, 2007

(87) PCT Pub. No.: WO2006/038629

PCT Pub. Date: Apr. 13, 2006

(65) Prior Publication Data

US 2008/0190092 A1    Aug. 14, 2008

(30) Foreign Application Priority Data

Oct. 5, 2004    (JP) .................. 2004-292846
Oct. 5, 2004    (JP) .................. 2004-292847

(51) Int. Cl.
F02C 9/00    (2006.01)

(52) U.S. Cl. .................. 60/39.281; 60/39.12

(58) Field of Classification Search .......... 60/39.12, 60/39.281, 39.463, 773, 780
See application file for complete search history.

(56) References Cited

U.S. PATENT DOCUMENTS 4,360,336 A * 11/1982 Shepherd .................. 431/12

(Continued)

FOREIGN PATENT DOCUMENTS

JP    57-183529    11/1982

(Continued)

OTHER PUBLICATIONS

Japanese Notice of Allowance mailed Mar. 16, 2010 for the corresponding Japanese Application No. 2004-292846.

Primary Examiner—Michael Cuff
Assistant Examiner—Phutthiwat Wongwian
(74) Attorney, Agent, or Firm—Leason Ellis LLP.

(57) ABSTRACT

A combined power generation unit includes a gasification unit with a gasification furnace that is used to produce fuel gas, and a gas turbine that uses the fuel gas to generate power. To produce the fuel gas required in the combined power generation unit according to a required power load, a feed-forward control of the gasification unit is performed. Also, a dead time compensator compensates for a lag and a dead time occurring while the fuel gas is fed from the gasification unit to the combined power generation unit. The gasification unit is operated using a zero flare process. The dead time compensator delays the power load required in the combined power generation unit on the basis of the lag and the dead time of the gasification unit so that the combined power generation unit is operated while a follow-up is performed with a predetermined delay.

9 Claims, 5 Drawing Sheets

U.S. PATENT DOCUMENTS

| | | |
|---|---|---|
| 4,442,665 A | 4/1984 | Fick et al. |
| 2003/0057003 A1* | 3/2003 | Kawada et al. ............. 180/65.1 |
| 2009/0100822 A1* | 4/2009 | Osakabe et al. .......... 60/39.281 |

FOREIGN PATENT DOCUMENTS

| | | |
|---|---|---|
| JP | 59-115406 | 7/1984 |
| JP | 61-205340 | 9/1986 |
| JP | 2-233807 | 9/1990 |
| JP | 2-45010 | 10/1990 |
| JP | 2-298633 | 12/1990 |
| JP | 3-43609 | 2/1991 |
| JP | 4-284137 | 10/1992 |
| JP | 5-71362 | 3/1993 |
| JP | 6-288262 | 10/1994 |
| JP | 07-234701 | 9/1995 |
| JP | 2685341 | 8/1997 |
| JP | 11-210412 | 8/1999 |
| JP | 2000-328073 | 11/2000 |
| JP | 2002-129910 | 5/2002 |

* cited by examiner

PRIOR ART

INTEGRATED GASIFICATION COMBINED CYCLE PLANT, METHOD OF CONTROLLING THE PLANT, AND METHOD OF PRODUCING FUEL GAS

TECHNICAL FIELD

The present invention relates to an integrated gasification combined cycle that includes a gasification unit and a combined power generation unit, a method of controlling the plant, and a method of producing fuel gas.

This application claims priority from Japanese Patent Application Nos. 2004-292846 and 2004-292847, filed on Oct. 5, 2004, in the Japan Patent Office, the disclosure of which is incorporated herein by reference in its entirety.

BACKGROUND ART

In recent years, an IGCC (Integrated Gasification Combined Cycle) that includes a gasification unit and a combined power generation unit (combination of a gas turbine and a steam turbine) has been attracting attention. In the IGCC, since heavy metals and sulfur are almost completely removed from raw materials such as residues and coal that are used as fuel gas of the gas turbine in the course of producing synthetic gas, and clean fuel gas that is almost the same as natural gas is used, the environmental pollution load is reduced, and the IGCC is rated a high as an environmentally-friendly next-generation power plant.

In general, in this system, the raw materials such as the residues and the coal are gasified in a gasification furnace, harmful substances are removed in a gas treatment unit to produce clean fuel gas, and power is generated by a gas turbine using the fuel gas.

Furthermore, in this system, examples of a method of controlling the system include a gasification furnace lead control method in which a gasification furnace is controlled so as to produce fuel gas with production rate that is required in a power plant and a gas turbine is operated using the produced fuel gas; and a turbine lead control method in which a gas turbine is controlled to generate power in the required amount according to a power load and the synthetic gas required to operate the gas turbine is supplied from a gasification furnace. Currently, in order to rapidly cope with a change in the required power load; a cooperative control method in which the gasification furnace lead control method and the turbine lead control method are combined is adopted to perform a feed-forward control with respect to the gasification furnace.

The cooperative control method will be described hereinafter.

Figure 3:
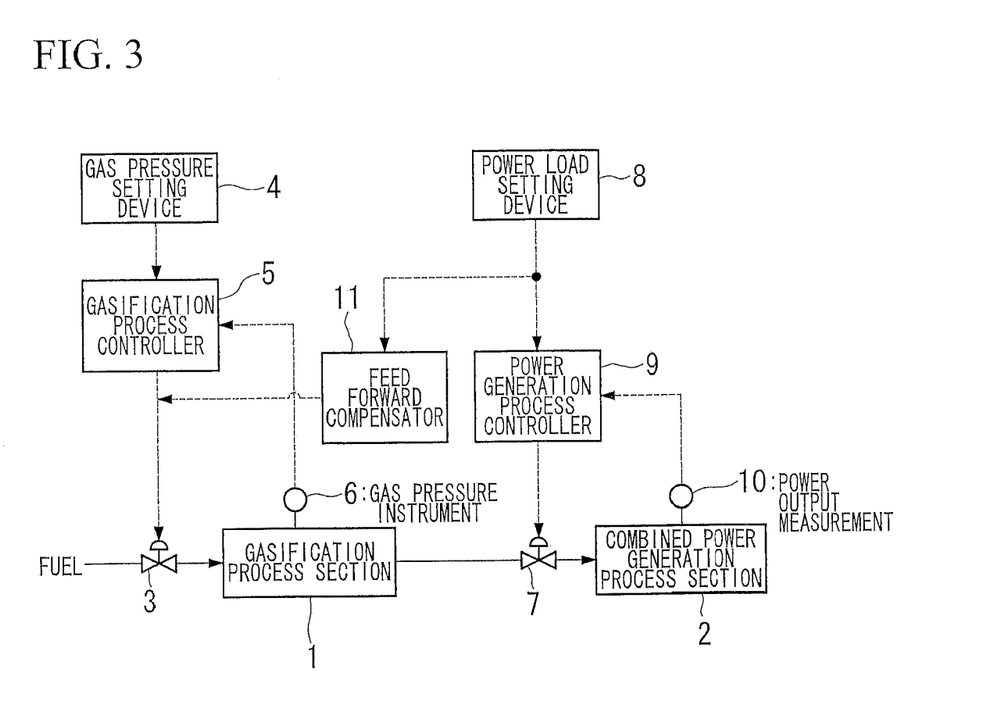
FIG. 3 is a circuit view illustrating a known integrated gasification combined cycle.

As shown in FIG. 3, an integrated gasification combined cycle is provided with a gasification process section 1 that gasifies fuel, and a combined power generation process section 2 that generates power by means of a gas turbine using the fuel gas supplied from the gasification process section 1.

In addition, a gasification process controller 5 to which a set value is transmitted from a gas pressure setting device 4 is connected to a fuel control valve 3 that is provided on a fuel feed line to the gasification process section 1, and the fuel control valve 3 is controlled using a control signal that is transmitted from the gasification process controller 5. The gasification process controller 5 computes a control value using a measurement signal that is transmitted from a gas pressure instrument 6 for measuring gas pressure in the gasification process section 1 and the set value that is obtained from the gas pressure setting device 4, and outputs a control signal to the fuel control valve 3.

Additionally, a power generation process controller 9 to which a set value is transmitted from a power load setting device 8 is connected to a gas control valve 7 that is provided on a gas feed line to the combined power generation process section 2, and the gas control valve 7 is controlled using the control signal that is transmitted from the power generation process controller 9. The power generation process controller 9 computes a control value using a measurement signal that is transmitted from a power output measurement 10 for measuring the power generation output of the combined power generation process section 2 and the set value that is obtained from the power load setting device 8, and outputs a control signal to the gas control valve 7.

In the integrated gasification combined cycle, in the case when the cooperative control system is performed, a feed-forward compensator 11 is provided, the set value is transmitted from the power load setting device 8 to the feed-forward compensator 11, and a feed-forward control signal is transmitted from the feed-forward compensator 11 to the fuel control valve 3. Accordingly, the feed rate of fuel that is supplied to the gasification process section 1 is increased or decreased according to a change in the required power load.

That is, in the cooperative control system, the gasification in the gasification furnace of the gasification process section 1 is rapidly controlled according to the change in the required power load.

The above-mentioned control technology is disclosed in, for example, Japanese Unexamined Patent Application, First Publication No. 2002-129910, Japanese Unexamined Patent Application, First Publication No. H07-234701, Japanese Patent Publication No. 2685341, and Japanese Unexamined Patent Application, First Publication No. H11-210412.

DISCLOSURE OF THE INVENTION

If the feed-forward control is performed, a following capability for controlling the gasification in the gasification furnace of the gasification process section 1 with respect to the change in the required power load may be improved. However, a lag and a dead time are present in the gasification furnace of the gasification process section 1. Accordingly, for example, if the change in the required power load is increased to a predetermined value or more, it takes a long time to detect an increase or a reduction in the pressure of fuel gas due to the dead time, and the production rate of fuel gas is drastically increased or reduced. Thus, the following capability for controlling the gasification with respect to the change in the required power load is poor.

In details in the case when the required power load is suddenly reduced, the consumption rate of fuel gas is reduced but the supplying rate of fuel gas is not rapidly reduced. Thus, surplus fuel gas is present. In connection with this, if the pressure of the fuel gas is a predetermined value or more, the surplus fuel gas is exhausted from the flare stack and combusted, or the surplus fuel gas is exhausted to a spare tank to prevent the pressure from being abnormally increased. In the case when the surplus fuel gas is exhausted from the flare stack and combusted, there are problems in that a loss of economic efficiency and an additional environmental load occur. In the case when the spare tank is provided, since the cost of equipment is increased or a large space is required, the plant cost is increased.

Meanwhile, in the case when the required power load is suddenly increased and the pressure falls below a predetermined value due to the supplying of the fuel gas that is not performed at a proper time, the power generation output of the gas turbine is not increased but reduced. Furthermore, if the pressure is reduced to a predetermined value or less, a stop signal is transmitted due to a turbine trip and come to stop the power generation.

If the following capability for controlling the gasification with respect to the change in the required power load is poor, the poor following capability significantly affects operation reliability of the integrated gasification combined cycle. In particular, if it is difficult to perform a continuous operation due to the stopping of the power generation, economic efficiency is significantly reduced.

The present invention has been completed in order to avoid the above-mentioned problems, and it is an object of the present invention to provide an integrated gasification combined cycle where the production rate of fuel gas produced in a gasification unit is stably maintained even though a required power load is significantly changed and the following capability for controlling the gasification with respect to the change in the required power load is improved.

The present integrated gasification combined cycle includes a gasification unit, a combined power generation unit where gas produced by the gasification unit is used as fuel and a gas turbine and a steam turbine are rotated using the fuel gas produced by the gasification unit to generate power, and a control system that performs a feed-forward control of the gasification unit to produce the fuel gas by the gasification unit with production rate required in the combined power generation unit according to a power load required in the combined power generation unit. The control system includes a dead time compensator that compensates for a lag and a dead time occurring while the fuel gas is fed from the gasification unit to the combined power generation unit.

Furthermore, the control system performs the feed-forward control of a compressor that compresses oxygen and transfers compressed oxygen to the gasification unit in order to perform a follow-up of the feed rate of oxygen required to produce the fuel gas by the gasification unit according to an increase or a reduction in the feed rate of the fuel gas produced by the gasification unit.

The control system performs the feed-forward control of an air separation unit that separates oxygen from air to feed oxygen to the gasification unit in order to perform the follow-up of the feed rate of oxygen required to produce the fuel gas by the gasification unit according to an increase or a reduction in the production rate of the fuel gas produced by the gasification unit.

A method of controlling an integrated gasification combined cycle including a gasification unit and a combined power generation unit where gas produced by the gasification unit is used as fuel and a gas turbine and a steam turbine are rotated using the fuel gas produced by the gasification unit to generate power includes outputting a feed-forward signal to a device constituting the gasification unit to increase or reduce a production rate of fuel gas so that the fuel gas is produced by the gasification unit with production rate required in the combined power generation unit according to a power load required in the combined power generation unit, and outputting a pseudo signal to compensate a lag and a dead time occurring while the fuel gas is fed from the gasification unit to the combined power generation unit, thereby performing a zero flare operation.

The zero flare operation is achieved in condition that a change rate in required power load is 3% or less per 1 min.

A method of producing fuel gas fed to a combined power generation unit includes outputting a feed-forward signal to a device constituting a gasification unit used to produce the fuel gas with production rate required in the combined power generation unit in order to increase or reduce the production rate of the produced fuel gas according to a power load required in the combined power generation unit, and outputting a pseudo signal to compensate a lag and a dead time occurring while the fuel gas is fed from the gasification unit to the combined power generation unit.

An integrated gasification combined cycle includes a gasification unit, a combined power generation unit where gas produced by the gasification unit is used as fuel and a gas turbine and a steam turbine are rotated using the fuel gas produced by the gasification unit to generate power, and a control system that performs a feed-forward control of the gasification unit to produce the fuel gas by the gasification unit with production rate required in the combined power generation unit according to a power load required in the combined power generation unit. The control system is provided with a dead time compensator that delays the power load required in the combined power generation unit on the basis that a lag and a dead time are present in the gasification unit so that the combined power generation unit is operated while the follow-up is performed with a predetermined delay.

The control system is provided with a fuel gas feed rate change compensator to compensate a set value for the feed-forward control transmitted to the gasification unit on the basis of a difference between a change in feed rate of the fuel gas required in the combined power generation unit that is operated while the follow-up is performed using the dead time compensator and a change in a practical production rate of the fuel gas.

The present method of controlling an integrated gasification combined cycle including a gasification unit and a combined power generation unit where gas produced by the gasification unit is used as fuel and a gas turbine and a steam turbine are rotated using the fuel gas produced by the gasification unit to generate power includes outputting a feed-forward signal to a device constituting the gasification unit to increase or reduce a production rate of fuel gas so that the fuel gas is produced by the gasification unit with feed rate required in the combined power generation unit according to a power load required in the combined power generation unit, and outputting a pseudo signal to the combined power generation unit in order to delay a power load required in the combined power generation unit on the supposition that a lag and a dead time are present in the gasification unit so that the combined power generation unit is operated while the follow-up is performed with a predetermined delay, thereby performing a zero flare operation.

The method further includes compensating a set value for a feed-forward control transmitted to the gasification unit on the basis of a difference between a change in a feed rate of the fuel gas required in the combined power generation unit and a change in a practical production rate of the fuel gas.

In the integrated gasification combined cycle of the present invention, the pseudo signal that shows the increase or the reduction in feed rate of the fuel gas before the increase or reduction in the practical production rate of the fuel gas from the gasification unit using the feed-forward control is outputted, and the dead time compensator is provided in the control system to compensate the dead time and the control delay of the gasification unit. Accordingly, in the case when the change in required power load is significant, the stabilization of the production rate of the fuel gas that is produced by the gasification unit is ensured, and the follow-up to the change in the required power load is improved. Particularly, in the case when the change in the required power load is 3% or less per 1 min. it is possible to operate the gasification unit using the zero flare process while facilities such as tanks are not prepared as a buffer for receiving surplus gas.

According to the present invention, since the control system performs the feed-forward control of the compressor that compresses oxygen and feeds the compressed oxygen to the gasification unit in order to follow-up the feed rate of oxygen required to produce the fuel gas by the gasification unit according to the increase or the reduction in the production rate of the fuel gas produced by the gasification unit, the feed rate of oxygen that is fed to the gasification unit can be stably ensured according to the load of the gasification unit.

According to the present invention, since the control system performs the feed-forward control of the air separation unit that separates oxygen from air in order to follow-up the feed rate of oxygen required to produce the fuel gas by the gasification unit while oxygen is separated from air according to the increase or the reduction in the production rate of the fuel gas produced by the gasification unit, the feed rate of oxygen that is fed to the gasification unit can be stably ensured according to the load of the gasification unit.

In the integrated gasification combined cycle according to the present invention, the dead time compensator that delays the power load required in the combined power generation unit on the basis of the lag and the dead time of the gasification unit so that the combined power generation unit is operated while the follow-up is performed with a predetermined delay is provided in the control system. Therefore, in the case when the change in the required power load is significant, the gasification unit is subjected to the feed-forward control according to the required power load. Furthermore, with respect to the gasification unit that is subjected to the feed-forward control, the operation of the combined power generation unit is performed on the basis of the lag and the dead time while the follow-up is stably performed with a predetermined delay, and the follow-up to the change in the required power load is improved. Sectionicularly, in the case when the change rate in the required power load is 3% or less per 1 min, it is possible to operate the gasification unit using the zero flare process while facilities such as tanks are not used as buffer for receiving surplus.

According to the present invention, the fuel gas feed rate change compensator is provided to compensate a set value for the feed-forward control transmitted to the gasification unit on the basis of a difference between the change in the feed rate of the fuel gas required in the combined power generation unit that is operated while the follow-up is performed using the dead time compensator and the change in the practical production rate of the fuel gas. Therefore, a difference between the production rate of the fuel gas discharged from the gasification unit and the feed rate of the fuel gas required in the combined power generation unit is significantly suppressed and the stable operation of the combined power generation unit is ensured.

REFERENCE NUMERALS

21: integrated gasification combined cycle
22: air separation unit
23: gasification furnace (gasification unit)
24: gas treatment unit (gasification unit)
25: combined power generation unit
26: oxygen compressor (compressor)
41: air separation unit load controller (control system)
42: gasification furnace load controller (control system)
43: power load controller (control system)
46: gasification plant dead time compensator (dead time compensator)
47: fuel gas production rate change compensator
71: dead time compensator

BEST MODE FOR CARRYING OUT THE INVENTION

Most preferred embodiments of the present invention will be described with reference to the drawings hereinafter.

First, an integrated gasification combined cycle to which a cooperative control system is applied and which is the standard of the embodiments of the invention will be described.

Figure 1:
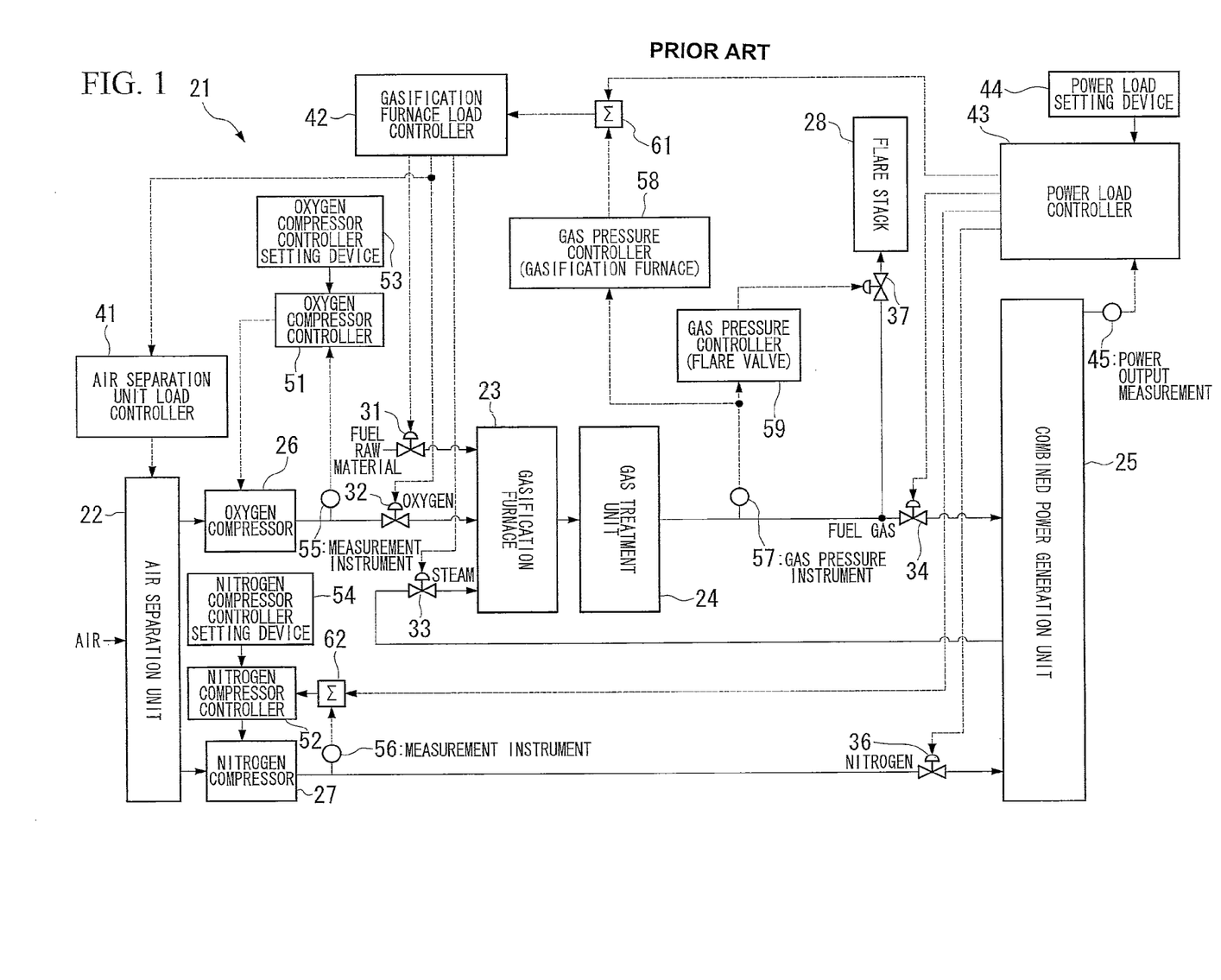
FIG. 1 is a circuit view illustrating Comparative example of an integrated gasification combined cycle to which a known cooperative control system is applied.

FIG. 1 is a circuit view illustrating an integrated gasification combined cycle to which a known cooperative control system is applied. FIG. 3 is a circuit view illustrating a known integrated gasification combined cycle. FIG. 1 illustrates the detailed configuration of the integrated gasification combined cycle to which the cooperative control system shown in FIG. 3 is applied, and the configuration will be described as a Comparative example with respect to the embodiments of the present invention.

As shown in the drawing, an integrated gasification combined cycle 21 is provided with an air separation unit 22, a gasification furnace 23, a gas treatment unit 24, and a combined power generation unit 25.

The air separation unit 22 separates inflow air into oxygen and nitrogen. Oxygen that is separated by the air separation unit 22 is compressed by an oxygen compressor 26 and then transmitted to the gasification furnace 23, and nitrogen is compressed by a nitrogen compressor 27 and then transmitted to the combined power generation unit 25.

Fuel raw materials such as residues and coal and steam from the combined power generation unit 25 are supplied to the gasification furnace 23. In the gasification furnace 23, the fuel gas that is not purified and contains hydrogen and carbon monoxide as main components is produced from oxygen, fuel raw materials, and steam.

The fuel gas that is not purified is transferred to the gas treatment unit 24 and subjected to dust removal and desulfurization processes to be purified in the gas treatment unit 24, and the purified fuel gas is transferred to the combined power generation unit 25.

The combined power generation unit 25 is provided with a gas turbine, a steam turbine, and a power generator.

The fuel gas that is mixed with nitrogen discharged from the nitrogen compressor 27 to have a predetermined concentration is supplied from the gas treatment unit 24 to the gas turbine. In addition, in the case of the gas turbine, the supplied fuel gas is combusted to rotate the turbine. The exhaust gas that is exhausted from the gas turbine is transferred to a boiler, steam is generated due to heat of exhaust gas and combustion heat of the fuel in the boiler, and the steam is transferred to the steam turbine. Accordingly, the steam turbine converts the supplied steam into kinetic energy that corresponds to rotation of the turbine. In addition, the power generator is driven by the gas turbine and the steam turbine to perform power generation. Meanwhile, auxiliary fuel such as kerosene may be fed through a feed line that is not shown to the combined power generation unit 25, and the gas turbine may be operated using the fuel gas or the auxiliary fuel.

Furthermore, a flare stack 28 is connected to a fuel gas line through which the fuel gas is fed to the combined power generation unit 25. In the flare stack 28, a fire of the fuel gas flares to exhaust the gas so that the pressure is prevented from being increased when the gas pressure of the fuel gas line is changed to a predetermined pressure value or more due to certain factors.

Additionally, in the integrated gasification combined cycle 21, control valves 31, 32, and 33 are provided at a feed line of the fuel raw material to the gasification furnace 23, a feed line of oxygen to the gasification furnace 23, and a feed line of steam to the gasification furnace 23, respectively, so that the feed rate of the fuel raw material, oxygen, and steam fed to the gasification furnace 23 are controlled. Above, the case of when the control valve is used as an feed rate control unit has been described. However, the revolution per unit time of the driving motor of the equipment such as a fuel feed pump and an air blower may be controlled while the control valve is not used to adjust the amount.

Furthermore, control valves 34 and 36 are provided at a feed line of the fuel gas to the combined power generation unit 25 and a feed line of nitrogen to the combined power generation unit 25, respectively, so that the feed rate of the fuel gas and nitrogen fed to the combined power generation unit 25 are controlled.

In addition, a control valve 37 is provided at a branched line of the fuel gas that is connected to the flare stack 28 so that the flow rate of the fuel gas fed to the flare stack 28 is controlled.

Next, a control system of the integrated gasification combined cycle 21 will be described.

The integrated gasification combined cycle 21 is provided with an air separation unit load controller 41, a gasification furnace load controller 42, and a power load controller 43.

The air separation unit load controller 41 outputs the control signal to the air separation unit 22 to perform the controlling.

The gasification furnace load controller 42 outputs the control signal to the control valves 31, 32, and 33 that are provided at the feed line of the fuel raw material, the feed line of oxygen, and the feed line of steam, respectively and controls the control valves 31, 32, and 33. Furthermore, the gasification furnace load controller 42 transmits the control signal that is transmitted to the control valve 32 provided at the feed line of oxygen to the air separation unit load controller 41.

A predetermined set value is transmitted from the power load setting device 44 to the power load controller 43. In addition, power output detection data is transmitted from the power output measurement 45 that detects the power output in the combined power generation unit 25 to the power load controller 43. The power load controller 43 outputs the control signal to the control valve 34 provided at the feed line of the fuel gas and the control valve 36 provided at the feed line of nitrogen, and controls the control valves 34 and 36. Accordingly, the power load controller 43 controls the combined power generation unit 25 using the power output as the controlled variable.

Furthermore, the power load controller 43 outputs the control signal to the gasification furnace load controller 42 and the nitrogen compressor controller 52 using adders 61 and 62.

An oxygen compressor controller 51 is provided in the oxygen compressor 26, and a predetermined set value is transmitted from an oxygen compressor controller setting device 53 to the oxygen compressor controller 51. In addition, measured data is transmitted from a measurement instrument 55 that measures the pressure or flow rate of the feed line of oxygen to the gasification furnace 23 to the oxygen compressor controller 51. Furthermore, the oxygen compressor controller 51 outputs a feedback control signal to the oxygen compressor 26 on the basis of the set value that is obtained from the oxygen compressor controller setting device 53 and the measured data that is obtained from the measurement instrument 55, and controls the oxygen compressor 26. Accordingly, the oxygen compressor 26 is controlled using the downstream pressure or flow rate as the controlled variable.

A nitrogen compressor controller 52 is provided in the nitrogen compressor 27, and a predetermined set value is transmitted from a nitrogen compressor controller setting device 54 to the nitrogen compressor controller 52. In addition, measured data is transmitted from a measurement instrument 56 that measures the pressure or flow rate of the feed line of nitrogen to the combined power generation unit 25 through the adder 62 to the nitrogen compressor controller 52. Furthermore, the nitrogen compressor controller 52 outputs the control signal to the nitrogen compressor 27 on the basis of the set value that is obtained from the nitrogen compressor controller setting device 54, and the added values of the measured data that is obtained from the measurement instrument 56 and the control signal that is obtained from the power load controller 43, and controls the nitrogen compressor 27. Accordingly, the nitrogen compressor 27 is controlled using the downstream pressure or flow rate as the controlled variable. In addition, the controlling of the oxygen compressor 26 and the nitrogen compressor 27 may be converted into any one of the pressure controlling and the flow rate controlling according to the load.

A gas pressure instrument 57 that measures the pressure of the fuel gas is provided at the fuel gas line through which the fuel gas is fed to the combined power generation unit 25, and the measured data is transmitted from the gas pressure instrument 57 to a gas pressure controller 58 for a gasification furnace and a gas pressure controller 59 for flare.

The gas pressure controller 58 for the gasification furnace outputs the control signal to the adder 61. Accordingly, the control signals that are transmitted from the gas pressure controller 58 for the gasification furnace and the power load controller 43 are added by the adder 61 and then transmitted to the gasification furnace load controller 42. That is, the gasification furnace 23 is controlled using the gas pressure of the fuel gas downstream of the gas treatment unit 24 as the controlled variable.

The gas pressure controller 59 for flare outputs the control signal to the control valve 37 provided at the branched line of the flare stack 28, and controls the control valve 37. In connection with this, the pressure set value of the gas pressure controller 59 for flare is slightly higher than that of the gas pressure controller 58 for the gasification furnace. Therefore, during the operation, the control valve 37 of the branched line is typically closed. However, in the case when the measured value of the gas pressure instrument 57 is more than the set value of the gas pressure controller 59 for flare, the control valve 37 of the branched line is opened and the flaring occurs in the flare stack 28.

In the integrated gasification combined cycle plant 21, the control signal is transmitted from the power load controller 43 through the adder 61 to the gasification furnace load controller 42 as the feed-forward control signal based on the set value that is obtained from the power load setting device 44. Accordingly, the gasification furnace load controller 42 controls the control valves 31, 32, and 33 provided at the feed lines of the fuel raw material, oxygen, and steam to the gasification furnace 23, respectively, and transmits the control signal to the air separation unit load controller 41 to control the air separation unit 22 on the basis of the signal to which the feed-forward control signal is added. Therefore, the flow rate of the fuel gas that is produced using the gasification furnace 23 and the gas treatment unit 24 is increased or reduced according to a change in required power load.

As a result, in the integrated gasification combined cycle 21 to which the cooperative control is applied according to Comparative example, the production rate of the fuel gas of the gasification unit that is provided with the gasification furnace 23 and the gas treatment unit 24 is rapidly controlled according to the change in required power load in a predetermined range.

Furthermore, in the integrated gasification combined cycle 21, the control signal that is transmitted from the power load controller 43 on the basis of the set value obtained from the power load setting device 44 is transmitted through the adder 62 to the nitrogen compressor controller 52 as the feed-forward control signal. Therefore, the flow rate of nitrogen that is fed to the combined power generation unit 25 using the nitrogen compressor 27 is rapidly increased or reduced according to the change in required power load.

In connection with this, in the integrated gasification combined cycle 21 of Comparative example, the feed-forward control is performed to increase or reduce the production rate of the fuel gas that is produced using the gasification furnace 23 and the gas treatment unit 24 according to the change in required power load. However, the lag and the dead time are present during the feeding of the fuel gas from the gasification unit to the power plant in the unit for producing the fuel gas using the gasification furnace 23 and the gas treatment unit 24.

The term "dead time" means the time in which the results are not obtained after an order (signal) is inputted to the process or the system. More precisely, the dead time is shown in FIGS. 4A to 4C.

Figure 4A:
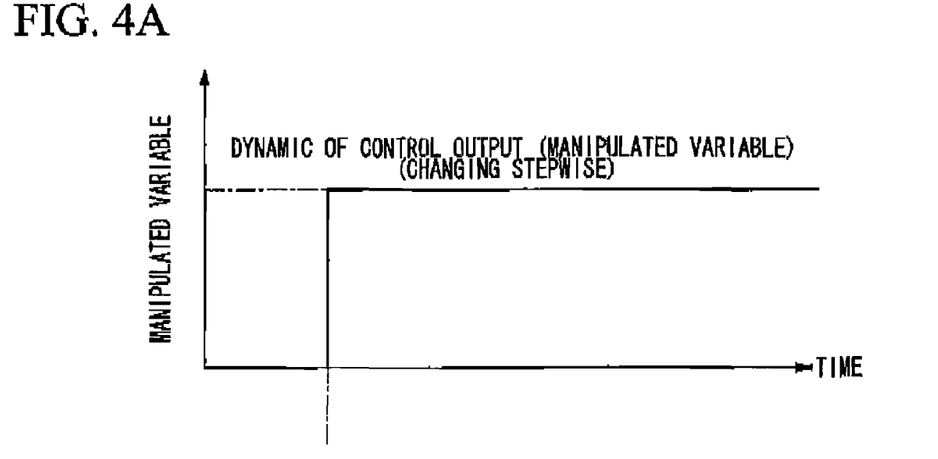
FIG. 4A is a graph illustrating dynamic behavior of a control output (manipulated variable) generated immediately when a signal is inputted.
Figure 4B:
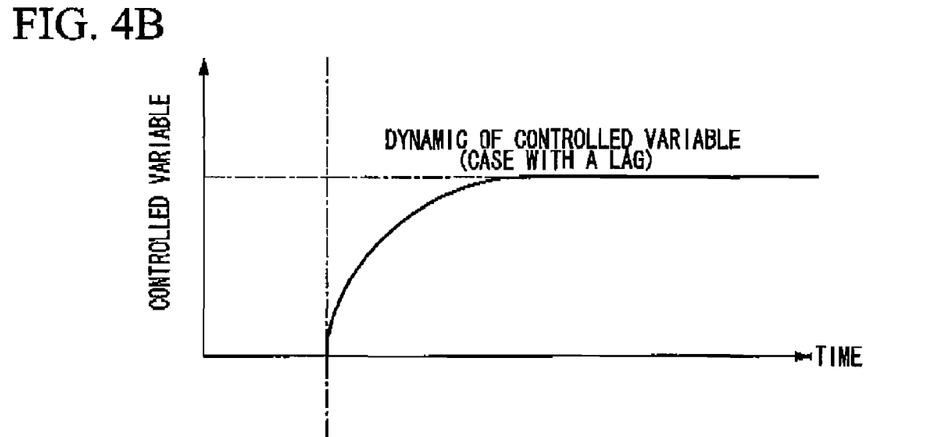
FIG. 4B is a graph illustrating dynamic behavior of a controlled variable with a lag characteristic when a signal of manipulated variable is input.
Figure 4C:
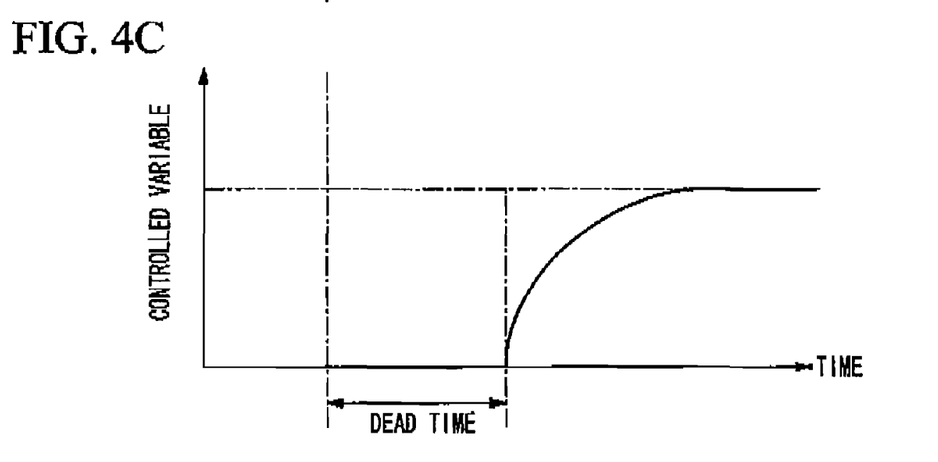
FIG. 4C is a graph illustrating dynamic behavior of a controlled variable with a lag and a dead time when a signal of manipulated variable is input.

That is, as shown in FIG. 4A, even though the control output (manipulation variable) is instantaneously started up, the dynamic of the controlled variable typically has the lag characteristic shown in FIG. 4B. Practically, if there is an dead time, as shown in FIG. 4C, the dynamic of the controlled variable has a large delay. In the invention, as shown in FIG. 4C, the compensation is performed with respect to the case when both the lag and the dead time are present.

Figure 2:
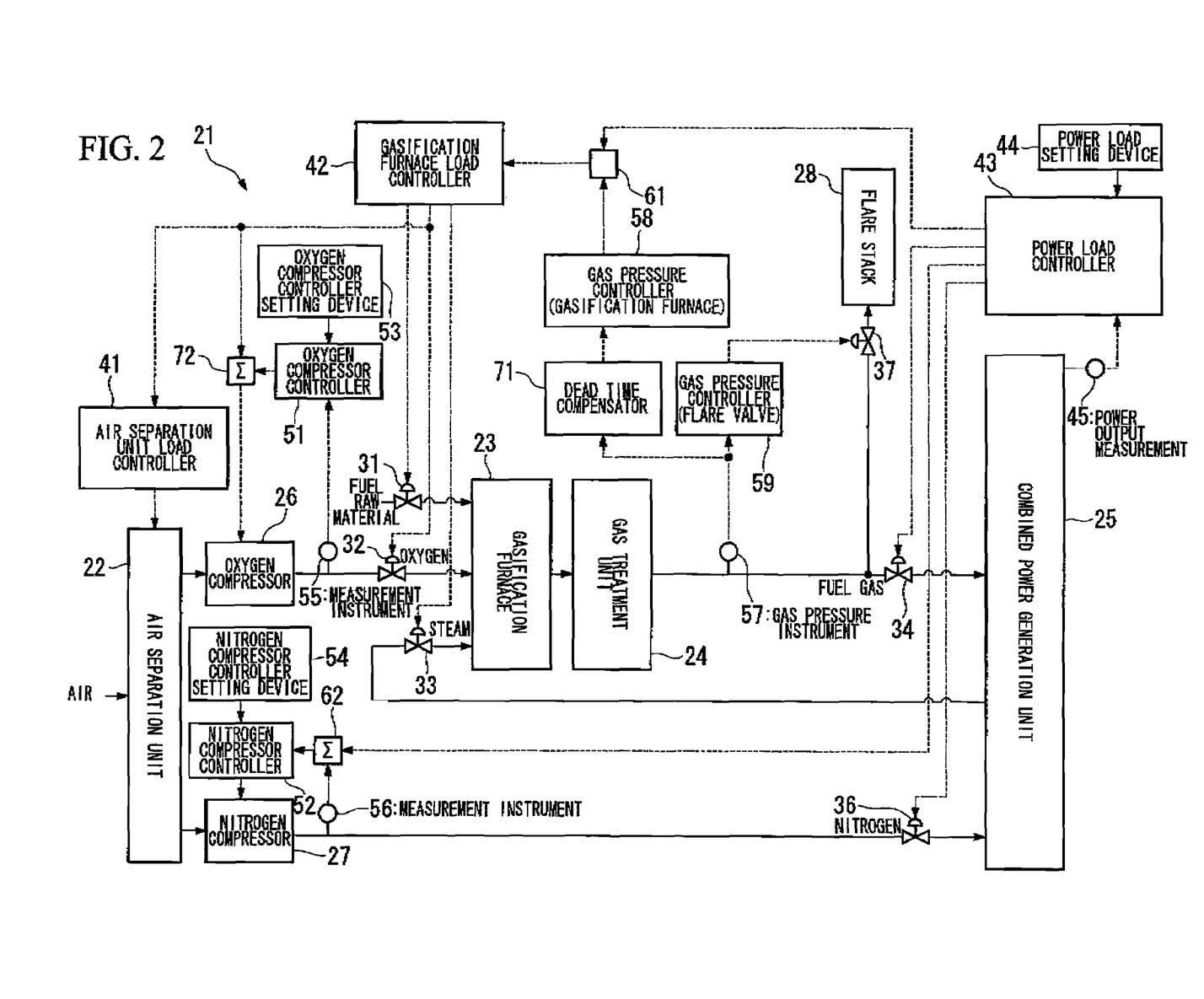
FIG. 2 is a circuit view illustrating an integration gasification combined cycle according to a first embodiment of the present invention.

FIG. 2 illustrates the integrated gasification combined cycle 21 according to a first embodiment of the present invention. The integrated gasification combined cycle 21 is provided with the cooperative control system of FIG. 1 and a dead time compensator that compensates the lag and the dead time. That is, the dead time compensator 71 is provided between the gas pressure instrument 57 and the gas pressure controller 58 for the gasification furnace.

Furthermore, the increase or the reduction in the flow rate of the fuel gas that is produced according to the required power load is detected as the increase or the reduction in pressure by using the dead time compensator 71, and a pseudo signal is transmitted to the gas pressure controller 58 for the gasification furnace, thus the manipulation amount is set to be small as if the change in power load is small even though the change in power load is large.

Therefore, in the case when the change in required power load is large, the production rate of fuel gas that is produced in the gasification furnace 23 is stabilized and the following capability for controlling the gasification with respect to the change in required power load is improved.

In the case when the production rate of fuel gas that is produced using the gasification furnace 23 and the gas treatment unit 24 is increased or reduced according to the change in required power load using the feed-forward control, it is necessary to increase or reduce the flow rate of oxygen that is supplied to the fuel gas.

Therefore, in this embodiment, an adder 72 is provided to add the control signal that is obtained from the gasification furnace load controller 42 to the control signal that is obtained from the oxygen compressor controller 51 and transmit the resulting signal to the oxygen compressor 26. Thus, the control signal that is transmitted from the gasification furnace load controller 42 on the basis of the feed-forward control signal that is obtained from the power load controller 43 is added to the control signal that is obtained from the oxygen compressor controller 51 as the feed-forward signal, and the oxygen compressor 26 is controlled using the resulting control signal.

That is, the oxygen compressor 26 is rapidly controlled with respect to the increase or the reduction in the production rate of fuel gas that is produced in the gasification furnace 23. In particular, the feed rate of oxygen that significantly affects a change in temperature of the gasification furnace 23 can be stably set according to the load of the gasification unit that is provided with the gasification furnace 23 and the gas treatment unit 24.

Furthermore, the feed rate of oxygen that is required to produce the fuel gas in the gasification unit that is provided with the gasification furnace 23 and the gas treatment unit 24 can be more stably set according to the load of the gasification unit that is provided with the gasification furnace 23 and the gas treatment unit 24 in order to separate oxygen from air according to the increase or the reduction in the production rate of fuel gas produced in the gasification unit to perform the follow-up and to perform the feed-forward control of the air separation unit 22.

Meanwhile, in the above-mentioned embodiment, the air separation unit for only the power generation system is provided, and the feed rate of oxygen or nitrogen is controlled using the air separation unit. However, an feed rate control unit that is used to supply required oxygen or nitrogen using an air separation unit for common use may be controlled.

EXAMPLES

The present invention will be described in light of Comparative example and Examples in detail hereinafter.

Comparative Example 1

In the case when the integrated gasification combined cycle of FIG. 1 was operated using the cooperative control system that included the feed-forward control with respect to the gasification unit, if the change rate in power load was 1.0% per 1 min, the range of change in pressure of the gas pressure instrument 57 was ±0.023 MPa of the set value.

In the same plant, if the change rate in power load was 3.0% per 1 min, the range of change in pressure of the gas pressure instrument was ±0.093 MPa of the set value.

Example 1

In the case when the integrated gasification combined cycle of FIG. 2 was operated, that is, in the case when the cooperative control of FIG. 1 was used, the dead time compensator 71 was provided, and the oxygen compressor 26 was subjected to the feed-forward control, the change rate in power load was 1.0% per 1 main, and the range of change in pressure of the gas pressure instrument 57 was ±0.013 MPa of the set value. In the same plant, even though the change rate in power load was 3.0% per 1 min, the range of change in pressure of the gas pressure instrument was ±0.053 MPa of the set value.

Example 2

In the case when the controlling was performed using the same method as in Example 1 except that the oxygen compressor 26 was controlled using the feedback control based on the measured value of the measurement instrument 55 of FIG. 1, if the change rate in power load was 1.0% per 1 min, the range of change in pressure of the gas pressure instrument 57 was ±0.017 MPa of the set value. In the same plant, if the change rate in power load was 3.0% per 1 min, the range of change in pressure of the gas pressure instrument was ±0.063 MPa of the set value.

From Comparative example and Examples, it can be seen that since the dead time compensator is provided, even though the change rate in power load is 3% per 1 min in the present invention, the range of change in feed pressure of the fuel gas is significantly reduced and the integrated gasification combined cycle is very stably and continuously operated.

Furthermore, it can be seen that since the feed-forward control of the oxygen compressor is additionally performed, a desirable effect is ensured.

The desirable following capability for controlling the gasification with respect to the change in power load means that it is unnecessary to exhaust the fuel gas from the flare stack and then combust the fuel gas. In particular, if the change rate in power load is 3% or less per 1 min, the operation is performed using a zero flare process where the fuel gas is not combusted nor exhausted from the flare stack as the flare gas, a loss to economic efficiency is prevented, and an environment friendly integrated gasification combined cycle is provided.

If the change in required power load is large, the detection of the increase or the reduction of the feed rate of fuel gas is delayed due to the dead time, thus drastically increasing or reducing the production rate of fuel gas. Accordingly, the following capability for controlling the gasification with respect to the change in required power load is poor.

Figure 5:
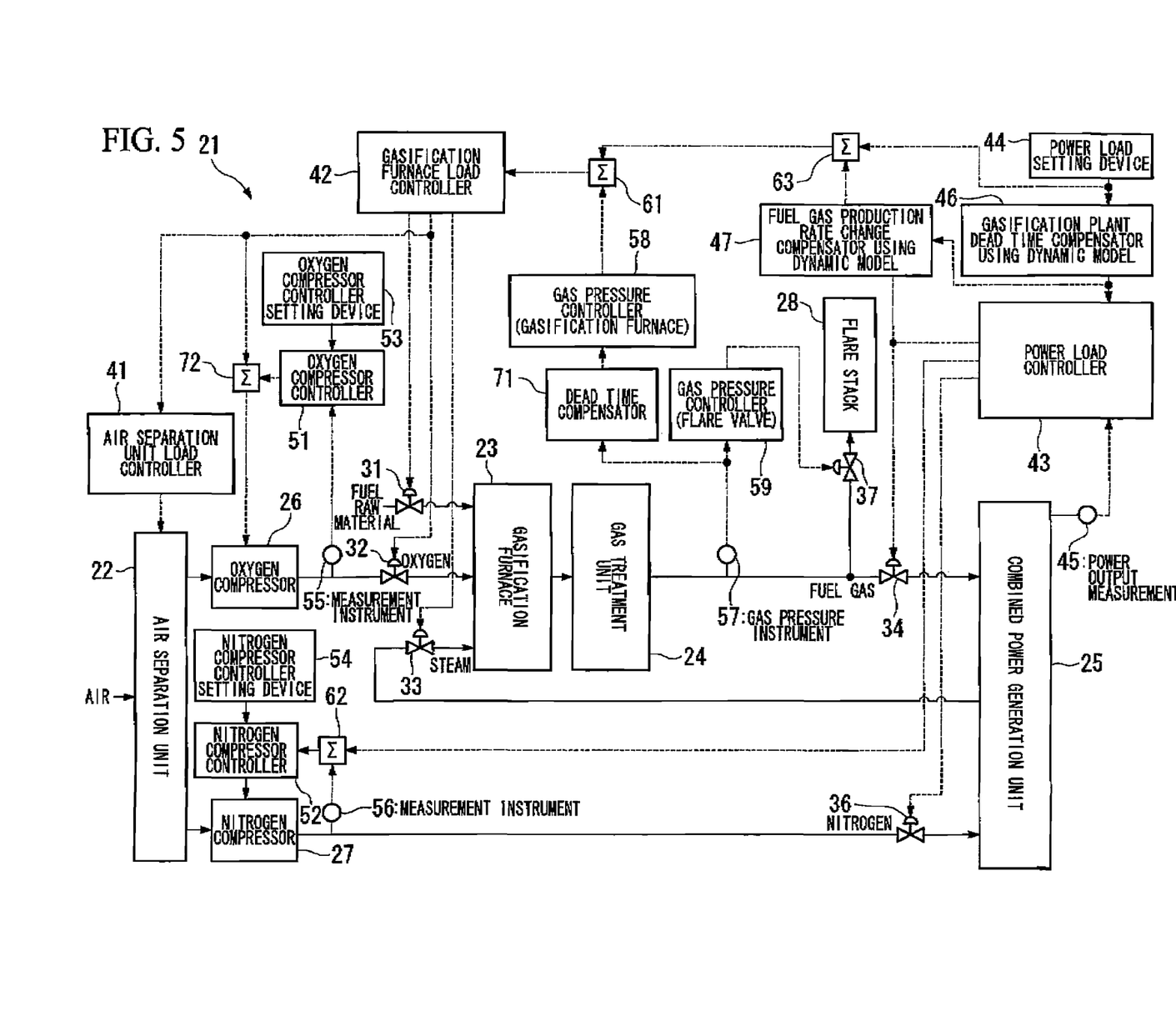
FIG. 5 is a circuit view illustrating an integrated gasification combined cycle according to a second embodiment of the invention.

FIG. 5 is a circuit view illustrating an integrated gasification combined cycle according to a second embodiment of the present invention. Since the following capability for controlling the gasification with respect to the change in required power load is poor, in this embodiment, as shown in FIG. 5, the dead time compensator is provided in addition to the cooperative control system of FIG. 1. With respect to this, the dead time compensator is provided to delay the required power load to the combined power generation unit assuming the lag and the dead time, thereby performing the follow-up of the combined power generation unit with a predetermined delay. That is, the gasification plant dead time compensator 46 is provided between the power load controller 43 and the power load setting device 44.

The gasification plant dead time compensator 46 uses a dynamic model that includes the influence of the pressure of the fuel gas on the change in set value of the power load setting device 44 and the influence of the pressure of the fuel gas on the change in output of the gas pressure controller 58. With respect to the set value of the power load setting device 44, the dead time of the gasification unit that is provided with the gasification furnace 23 and the gas treatment unit 24 is compensated. Furthermore, the operation of the combined power generation unit 25 is intentionally delayed by the gasification plant dead time compensator 46, and the follow-up is stably performed with a predetermined delay with respect to the set value of the power load from the power load setting device 44.

In the above-mentioned integrated gasification combined cycle 21, in the case when the change in required power load is large, the gasification unit that is provided with the gasification furnace 23 and the gas treatment unit 24 is subjected to the feed-forward control according to the required power load. With respect to the gasification unit that is subjected to the feed-forward control, the combined power generation unit 25 is operated with a predetermined delay while the stable follow-up is ensured in consideration of the lag and the dead time of the gasification unit, and the following capability for controlling the gasification with respect to the change in required power load is improved.

Furthermore, the integrated gasification combined cycle 21 is provided with a fuel gas feed rate change compensator 47 in order to compensate the intentional delay of the set value of the power load and a difference between the change in feed rate of the fuel gas required in the combined power generation unit 25 and the change in practical production rate of the fuel gas using the gasification plant dead time compensator 46. In the fuel gas feed rate change compensator 47, the compensation value is added to the set value of the power load that is transmitted from the power load setting device 44 to the gasification furnace load controller 42 in the adder 63 to compensate the set value of the power load that is transmitted as the feed-forward control signal.

Since the fuel gas feed rate change compensator 47 that compensates the set value that is transmitted to the gasification furnace load controller 42 and used to perform the feed-forward control is provided on the basis of the difference between the change in feed rate of the fuel gas that is required in the combined power generation unit 25 followed up and operated by the gasification plant dead time compensator 46 and the change in real production rate of the fuel gas, the difference between the production rate of fuel gas transferred from the gasification unit that is provided with the gasification furnace 23 and the gas treatment unit 24 and the feed rate of the fuel gas required in the combined power generation unit 25 is suppressed, and the combined power generation unit 25 is stably operated.

In the case when the production rate of fuel gas that is produced using the gasification furnace 23 and the gas treatment unit 24 is increased or reduced according to the required power load using the feed-forward control, it is necessary to increase or reduce the feed rate of oxygen that is supplied to the fuel gas.

Accordingly, in this embodiment, an adder 72 is provided to add the control signal that is obtained from the gasification furnace load controller 42 to the control signal that is obtained from the oxygen compressor controller 51 and to transmit the resulting control signal to the oxygen compressor 26. Thus, the control signal that is transmitted from the gasification furnace load controller 42 on the basis of the feed-forward control signal that is obtained from the power load controller 43 is added to the control signal that is obtained from the oxygen compressor controller 51 as the feed-forward signal, and the oxygen compressor 26 is controlled using the resulting control signal.

That is, the oxygen compressor 26 is rapidly controlled with respect to the increase or the reduction in the production rate of fuel gas that is produced in the gasification furnace 23. In particular, the feed rate of oxygen that significantly affects a change in temperature of the gasification furnace 23 can be stably set according to the load of the gasification unit that is provided with the gasification furnace 23 and the gas treatment unit 24.

Furthermore, the feed rate of oxygen that is required to produce the fuel gas in the gasification unit that is provided with the gasification furnace 23 and the gas treatment unit 24 can be stably set according to the load of the gasification unit that is provided with the gasification furnace 23 and the gas treatment unit 24 in order to separate oxygen from air according to the increase or the reduction in the production rate of fuel gas produced in the gasification unit to perform the follow-up and to perform the feed-forward control of the air separation unit 22.

INDUSTRIAL APPLICABILITY

The present invention is applied to an integrated gasification combined cycle where the production rate of fuel gas produced in a gasification unit is stably maintained and the following capability for controlling the gasification with respect to a change in required power load is improved.

The invention claimed is:

1. An integrated gasification combined cycle plant comprising:
   a gasification unit;
   a combined power generation unit where gas produced by the gasification unit is used as fuel, and a gas turbine and a steam turbine are rotated using the fuel gas produced by the gasification unit to generate power; and
   a control system that performs a feed-forward control of the gasification unit to produce the fuel gas with a production rate required in the combined power generation unit according to a power load required in the combined power generation unit,
   wherein the control system includes a dead time compensator that compensates for a lag and a dead time occurring while the fuel gas is fed from the gasification unit to the combined power generation unit in addition to the feed-forward control, and
   wherein said dead time compensator detects an increase or a reduction in the flow rate of the fuel gas that is produced according to the required power load as an increase or a reduction in pressure, and transmits a pseudo signal to a gas pressure controller so that the manipulation amount is set to be small as if the change in power load is small, even though the change in power load is large.

2. The integrated gasification combined cycle plant according to claim 1,
   wherein the control system performs the feed-forward control of a compressor that compresses oxygen and transfers compressed oxygen to the gasification unit in order to perform a follow-up of the feed rate of oxygen required to produce the fuel gas by the gasification unit according to an increase or a reduction in the production rate of the fuel gas produced by the gasification unit.

3. The integrated gasification combined cycle plant according to claim 2, wherein the control system performs the feed-forward control of an air separation unit that separates oxygen from air to feed oxygen to the gasification unit in order to perform the follow-up of the feed rate of oxygen required to produce the fuel gas by the gasification unit according to an increase or a reduction in the production rate of the fuel gas produced by the gasification unit.

4. An integrated gasification combined cycle plant comprising:
   a gasification unit;
   a combined power generation unit where gas produced by the gasification unit is used as fuel and a gas turbine and a steam turbine are rotated using the fuel gas produced by the gasification unit to generate power; and
   a control system that performs a feed-forward control of the gasification unit to produce the fuel gas with a production rate required in the combined power generation unit according to a power load required in the combined power generation unit,
   wherein the control system is provided with a dead time compensator that delays the power load required in the combined power generation unit on the supposition that a lag and a dead time are present in the gasification unit so that the combined power generation unit is operated while the follow-up is performed with a predetermined delay, and
   wherein said dead time compensator detects an increase or a reduction in the flow rate of the fuel gas that is produced according to the required power load as an increase or a reduction in pressure, and transmits a pseudo signal to a gas pressure controller so that the manipulation amount is set to be small as if the change in power load is small, even though the change in power load is large.

5. The integrated gasification combined cycle plant according to claim 4, wherein the control system is provided with a fuel gas feed rate change compensator to compensate a set value for the feed-forward control transmitted to the gasification unit on the basis of a difference between a change in an feed rate of the fuel gas required in the combined power generation unit that is operated while the follow-up is performed using the dead time compensator and a change in a practical production rate of the fuel gas.

6. The integrated gasification combined cycle plant according to claim 5, wherein the control system performs the feed-forward control of a compressor that compresses oxygen and transfers compressed oxygen to the gasification unit in order to perform the follow-up of the feed rate of oxygen required to produce the fuel gas by the gasification unit according to an increase or a reduction in the production rate of the fuel gas produced by the gasification unit.

7. The integrated gasification combined cycle plant according to claim 6, wherein the control system performs the feed-forward control of an air separation unit that separates oxygen from air to feed oxygen to the gasification unit in order to perform the follow-up of the feed rate of oxygen required to produce the fuel gas by the gasification unit according to the increase or the reduction in the production rate of the fuel gas produced by the gasification unit.

8. An integrated gasification combined cycle plant comprising:
   a gasification unit;
   a combined power generation unit where gas produced by the gasification unit is used as fuel and a gas turbine and a steam turbine are rotated using the fuel gas produced by the gasification unit to generate power;

a control system that performs a feed-forward control of the gasification unit to produce the fuel gas by the gasification unit in a feed rate required in the combined power generation unit according to a power load required in the combined power generation unit;

a dead time compensator that compensates a lag and a dead time occurring while the fuel gas is fed from the gasification unit to the combined power generation unit in addition to the feed-forward control, and wherein said dead time compensator that compensate the lag and the dead time detects an increase or a reduction in the flow rate of the fuel gas that is produced according to the required power load as an increase or a reduction in pressure, and transmits a pseudo signal to a gas pressure controller so that the manipulation amount is set to be small as if the change in power load is small, even though the change in power load is large; and a dead time compensator that delays a power load required in the combined power generation unit on the supposition that the lag and the dead time are present in the gasification unit so that the combined power generation unit is operated while a follow-up is performed with a predetermined.

9. An integrated gasification combined cycle plant comprising:

a gasification unit that produces gas from a predetermined raw material;

a combined power generation unit that uses the gas fed from the gasification unit as fuel;

a first controller that is connected to the gasification unit to control a load of the gasification unit;

a second controller that is connected to the combined power generation unit to control a load of the combined power generation unit according to a required power load from the outside;

a feed-forward control device that responds to signals from the first controller and the second controller to control the feeding of the raw material to the gasification unit; and at least one of a first dead time compensator that compensates a delay of the response of the gasification unit to the signals from the first controller and the second controller and a second dead time compensator that provides a predetermined delay to the response of the combined power generation unit on the basis of the delay of the response of the gasification unit, and wherein the first dead time compensator detects an increase or a reduction in the flow rate of the fuel gas that is produced according to the required power load as an increase or a reduction in pressure, and transmits a pseudo signal to the first controller so that the manipulation amount is set to be small as if the change in power load is small, even though the change in power load is large.

* * * * *